United States Patent [19]

Koivunen

[11] B 3,924,577
[45] Dec. 9, 1975

[54] ACCESSORY SHAFT DRIVE FOR A ROTARY MACHINE

[75] Inventor: Erkki A. Koivunen, Livonia, Mich.

[73] Assignee: General Motors Corporation, Detroit, Mich.

[22] Filed: Oct. 11, 1973

[21] Appl. No.: 405,495

[44] Published under the Trial Voluntary Protest Program on January 28, 1975 as document no. B 405,495.

[52] U.S. Cl. .............. 123/8.01; 418/61 A; 418/181
[51] Int. Cl.² ......................................... F02B 67/04
[58] Field of Search .......... 123/8.01, 8.45; 418/181, 418/61 A

[56] References Cited
UNITED STATES PATENTS

| | | | |
|---|---|---|---|
| 3,163,156 | 12/1964 | Peras ................................. | 123/8.01 |
| 3,483,694 | 12/1969 | Huber et al...................... | 418/61 A |

*Primary Examiner*—C. J. Husar
*Assistant Examiner*—Leonard Smith
*Attorney, Agent, or Firm*—Charles R. Engle

[57] ABSTRACT

A rotary machine such as a pump, compressor or an internal combustion engine having a piston rotating within a cylindrical housing enclosed by side housing members defining a configured working chamber therein. Rotation of the piston within the working chamber causes it to pass through compression and expansion cycles as it planetates relative to a crankshaft. A fixed phasing gear extending into the working chamber is secured to a side housing while a phasing gear secured to the rotary piston meshes with the fixed gear to provide the planetating movement. An accessory drive shaft such as an ignition distributor shaft is rotatably mounted in the side housing supporting the fixed phasing gear adjacent the crankshaft. The accessory shaft has a driven gear fixed thereto that is engaged by a drive gear having a cylindrical body portion, the body portion being attached to the crankshaft for rotation therewith. The cylindrical body portion of the drive gear overlies the fixed phasing gear and contains a circumferential slot permitting engagement of the phasing gears so as to reduce the axial length requirements of the accessory drive arrangement and consequently the overall length of the engine housing. The cylindrical drive gear can be integral with a closure member providing a bearing surface for the crankshaft.

4 Claims, 3 Drawing Figures

ACCESSORY SHAFT DRIVE FOR A ROTARY MACHINE

This invention relates to a rotary machine and more specifically to an improved means of driving a rotary machine accessory shaft.

In rotary machines such as rotary combustion engines, pumps and compressors, axial length of the overall machine housing is a significant factor in adapting the machine for various installations. In the case of a rotary combustion engine, current manufacture of more compact vehicles has necessarily limited engine compartment space. Also the addition of exhaust control and occupant comfort systems requires the use of more space in the vehicle engine compartment as these components are attached to the engine and usually a drive arrangement is required. The drive arrangement for these components often becomes somewhat complex requiring substantial installation space.

The present invention makes use of a closure member utilized to enclose the working chamber in a rotary machine side housing. The closure member receives a bearing supporting surface for the machine crankshaft and has a fixed rotary piston phasing gear secured thereto. In preferred form, this gear is integral with the closure member and is concentrially disposed about the crankshaft so as to extend into the working chamber interiorly of the side housing. An accessory shaft drive gear, in the form of a cylindrical sleeve having gear teeth at a free end of the sleeve and a securing flange at the other end, is secured to the crankshaft at a point inside the working chamber interiorly of the side housing. The sleeve accessory drive gear overlies the fixed phasing gear and contains a circumferential slot permitting engagement of the phasing gears providing planetating movement of the rotary piston relative to the crankshaft. By overlying the fixed phasing gear and extending axially along the crankshaft, the accessory drive gear provides for a shorter axial length of the engine. The driving connection to the accessory drive shaft is provided by rotatably mounting an accessory drive shaft in the side housing adjacent the crankshaft and affixing a driven gear thereto. The accessory shaft drive gear attached to the crankshaft engages the driven gear and provides rotation of the accessory shaft during rotation of the crankshaft.

Accordingly, a prime object of this invention is the provision of an accessory shaft drive arrangement requiring a relatively short axial length and use of minimum parts in establishing the drive connection.

Another object of this invention is the provision of a drive connection to an accessory shaft in a rotary machine wherein a driving gear is connected to a crankshaft of the machine and extends concentrically and axially along a portion of the crankshaft for engagement with a driven gear secured to the accessory shaft.

A further object of this invention is the provision of an accessory shaft drive arrangement wherein an accessory shaft is rotatably supported in a side housing member of a rotary machine adjacent where a crankshaft is also rotatably supported, a closure member is provided sealing the aperture and providing a bearing surface for the crankshaft in the area where it passes through the side housing member and a fixed phasing gear being attached to the closure member and being positioned in the working chamber of the rotary machine for engagement with a phasing gear secured to a rotary piston providing planetating movement of the piston relative to the crankshaft.

A still further object of this invention is the provision of a drive connection between a rotary machine crankshaft and an accessory shaft wherein the accessory shaft is rotatably supported in a machine side housing member and has a driven gear affixed thereto which is engaged by a cylindrical sleeve drive gear attached to the crankshaft for rotation therewith, the sleeve gear including a circumferential slot providing for engagement of a rotary piston phasing gear with a fixed phasing gear providing planetating movement of the rotary piston relative to the crankshaft.

Another object of this invention is the provision of a drive connection between an ignition distributor drive shaft and a rotary combustion engine crankshaft wherein a cylindrical sleeve gear is attached to an eccentric on the crankshaft, the eccentric rotatably supporting a rotary piston within a working chamber in the engine housing, the engine housing being defined by a side housing member having an aperture therein receiving a portion of the crankshaft, a closure member engaging said side housing and providing a bearing surface for the crankshaft in the area where it passes through the side housing member and having an integral fixed phasing gear formed thereon positioned within the working chamber of the engine, the cylindrical sleeve drive gear overlying the fixed phasing gear and including a circumferential slot providing for meshing engagement of the fixed phasing gear with a phasing gear secured to the rotary piston so that the piston planetates relative to the crankshaft and the cylindrical drive gear engaging a driven gear affixed to the ignition distributor shaft which is rotatably supported in the side housing member adjacent the aperture therein.

The novel features which I believe to be characteristic of my invention are set forth with particularity in the appended claims. My invention itself, however, both as to its organization and method of operation, together with further objects and adventages thereof, will best be understood by reference to the following description taken in conjunction with the accompanying drawings in which:

Figure 1:
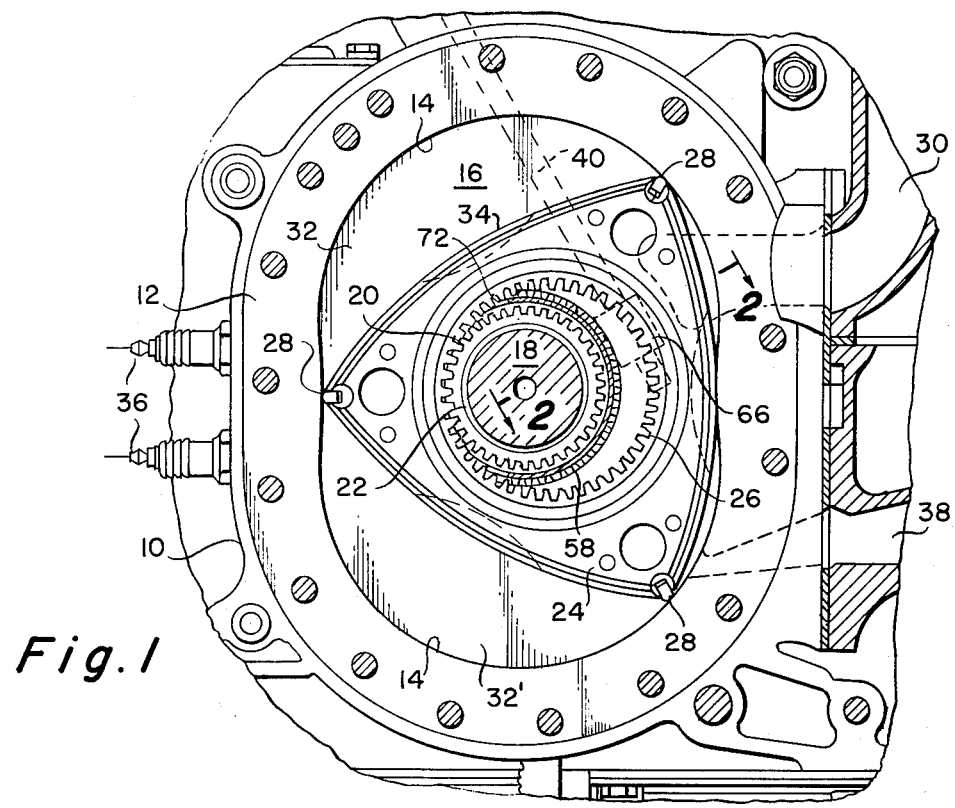
FIG. 1 is an elevational view of a rotary machine with one side housing member removed to illustrate a rotor positioned for planetating movement within a trochoidal housing formed in the machine housing.
Figure 2:
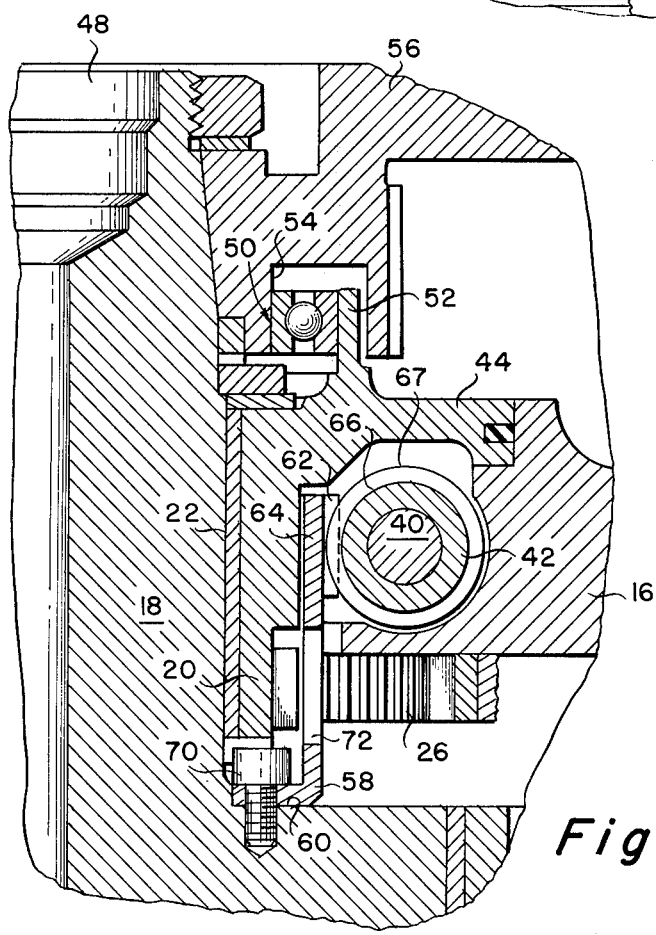
FIG. 2 is a fragmentary enlarged view taken in cross section on line 2—2 of FIG. 1.

With reference now to FIG. 1, an engine housing 10 includes a center casing member 12 machined to have a trochoidal working chamber 14 formed therein. A side housing member 16 encloses the rear side of the central housing 12 and rotatably supports one end of a crankshaft 18. A fixed phasing gear 20 is secured to side housing member 16 and extends axially along crankshaft 18 as is best illustrated in FIG. 2. A bearing 22 in the form of a sleeve is concentrically positioned upon the crankshaft 18 and provides for relative rotation between the crankshaft 18 and the fixed phasing gear 20.

With reference again to FIG. 1, a piston 24 is mounted upon an eccentric, not shown, secured to crankshaft 18 and has a phasing gear 26 affixed thereto or integral therewith. The piston phasing gear 26 meshes with the fixed phasing gear 20 to develop a predetermined planetating relationship between the piston 24 and the crankshaft 18. The piston rotates so that one of its apexes 28 seals intake passage 30 and a working chamber 32 defined by the trochoidal chamber 14 and face 34 of the piston reduces in volume until the side 34 of the piston is at top dead center adjacent a pair of spark plugs 26 whereupon a compressed air-fuel mixture is exploded to provide the power cycle in the rotary machine when it is in the form of an internal combustion engine. Continued rotation of the piston 24 causes the burned gases in chamber 32' to be moved along the trochoidal surface 14 until they are forced out exhaust passage 38. This is the conventional mode of operation for a rotary internal combustion engine.

The present invention concerns the mounting of an accesssory shaft 40 which is positioned substantially normal to the axis of crankshaft 18 as is illustrated in FIG. 2. The accessory drive shaft 40 is rotatably mounted within a sleeve bearing 42 which can either be secured to side housing 16 or end closure plate 44 as desired. The closure plate 44 and the side housing member 16 are both configured to provide a cavity 67 receiving a driven gear 66. In preferred form, the fixed phasing gear 20 is integral with the closure plate 44 which is secured in side housing 16 to enclose aperture 46. The closure plate 44 receives and rotatably supports end 48 of crankshaft 18 via the sleeve bearing 22. The closure plate 44 supports the aforementioned bearing sleeve 22 providing for relative rotation between the fixed phasing gear 20 and the crankshaft 18. A bearing assembly 50 is provided between a flange 52 of the closure plate 44 and a bearing surface 54 on a transmission input flange 56 as illustrated.

A cylindrical sleeve accessory shaft drive gear 58 is secured to a bearing portion 60 of crankshaft 18 and extends axially therealong so as to overlie the fixed phasing gear 20 as best shown in FIG. 2. The cylindrical accessory shaft gear 58 has teeth 62 formed adjacent free end 64 thereof, the teeth being in driving engagement with a driven gear 66 secured to accessory shaft 40 which in preferred form is an engine ignition distributor shaft.

Figure 3:
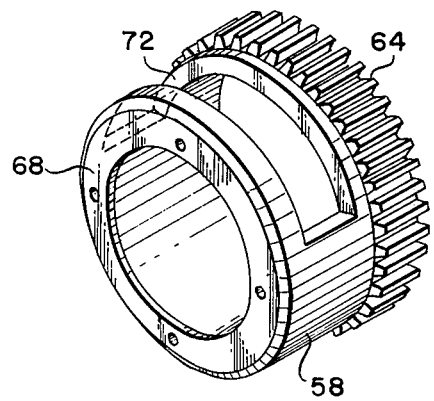
FIG. 3 is a perspective view illustrating the form of the accessory shaft drive gear of this invention.

With reference now to FIG. 3, it can be seen that the accessory shaft drive gear 58 includes a flange 68 so that it may be releasably secured to the crankshaft bearing portion 60 via a plurality of machine screws 70. The accessory shaft drive gear 58 also includes a circumferentially extending slot 72 which overlies the fixed phasing gear 20 when secured to the crankshaft. The slot 72 provides for mating engagement of the phasing gear 26 of the rotor 24 with fixed gear 20 as they extend through the slot 72 for continual engagement while the piston 24 rotates relative to crankshaft 18.

From the above description it is apparent that the utilization of a sleeve type drive gear containing an aperture 72 which overlies a fixed phasing gear 20 to provide for driving engagement therewith by rotor gear 26 results in a reduction in the axial length of the assembly of these components. This arrangement allows the side housing member 16 to be placed at a closer axial distance to the bearing surface 60 on crankshaft 18. Therefore, the overall length of a rotary machine is reduced by this inventive arrangement providing for a more compact machine assembly.

While I have shown and described a particular embodiment of my invention it will, of course, be understood that various modifications and alternative constructions thereof may be made without departing from the true spirit and scope of my invention and that I intend by the appended claims to cover all such modification and alternative constructions as fall within the true spirit and scope of my invention.

I claim:

1. In a rotary machine comprising a cylindrical housing, a side housing closing each side of said cylindrical housing, said cylindrical housing having an internal peripheral wall cooperating with end walls of said side housings defining a cavity therein, a crankshaft rotatably mounted in said side housings and extending through said cavity, a rotor rotatably mounted on said crankshaft for rotation within said cavity, a fixed phasing gear attached to one of said side housings, a phasing gear secured to said rotor and meshing with said fixed gear so that said rotor rotates and planetates relative to said crankshaft, an accessory drive shaft rotatably mounted in said one of said side housings adjacent said crankshaft, a driven gear attached to said accessory shaft, and a cylindrical drive gear attached to said crankshaft and extending axially therealong overlying said fixed phasing gear and meshing with said accessory shaft driven gear rotating said accessory shaft with said crankshaft, said cylindrical drive gear having a circumferential slot therein permitting meshing engagement between said fixed phasing gear and said rotor phasing gear.

2. In a rotary internal combustion engine a cylindrical housing defining a working chamber receiving a rotary piston, side housings enclosing said cavity, said side housings having axially aligned apertures therein, a crankshaft extending through said working chamber and said side housings and being rotatably supported in said side housings, said crankshaft having an eccentric formed thereon, said eccentric being positioned within said cavity, a rotary piston rotatably mounted on said eccentric for planetating movement relative to said eccentric, a phasing gear fixed to said rotor, an ignition distributor drive shaft rotatably supported in one of said side housings adjacent said crankshaft, a driven gear attached to said distributor drive shaft, a closure member fitting within said aperture adjacent said crankshaft enclosing said aperture and providing a bearing support surface for said crankshaft, a fixed gear secured to said closure member, and a distributor drive gear secured to said crankshaft and overlying said fixed phasing gear and engaging said distributor driven gear, said distributor drive gear including a cylindrical body portion having a circumferential slot therein in a portion of its area overlying said fixed phasing gear whereby said rotor phasing gear continually engages said fixed phasing gear providing for planetating movement of said rotor relative to said crankshaft during operation of the rotary internal combustion engine.

3. In a rotary internal combustion engine a cylindrical housing defining an epitrochoidal cavity, side housing members enclosing said cavity, a crankshaft rotatably supported in apertures in said side housings, a bearing land surface on said crankshaft, a rotor rotatably mounted on said crankshaft for planetating movement relative thereto, a phasing gear fixed to said rotor, an ignition distributor drive shaft rotatably supported in one of said side housings adjacent said crankshaft in a position substantially normal to the longitudinal axis of said shaft, a crankshaft bearing support member positioned in one of said side housing apertures sealingly engaging said side housing and rotatably supporting said crankshaft, a fixed phasing gear integral with said bearing support member positioned inwardly of said side housing in said epitrochoidal cavity and being meshed with said rotor phasing gear, a driven gear attached to said distributor drive shaft, and a distributor drive gear attached to the bearing land and having a cylindrical body portion overlying said fixed phasing gear and extending outwardly of said crankshaft bearing land terminating in an integral external gear engaging said distributor shaft driven gear, said cylindrical body portion of said drive gear including a circumferential slot aligned with said fixed phasing gear permitting said rotor phasing gear to be continually meshed with said fixed phasing gear whereby said rotor planetates relative to said crankshaft during operation of the internal combustion engine.

4. In a rotary internal combustion engine of the type including an epitrochoidal cavity in a cylindrical housing, side housing members enclosing said cavity forming a working chamber for a rotary piston, a crankshaft rotatably supported in apertures in said side housings, an eccentric on said crankshaft rotatably supporting said rotary piston, a phasing gear secured to said rotary piston, a closure member sealingly positioned within an aperture of one of said side housing members and providing a bearing surface for one end of said crankshaft; the improvement comprising: a fixed phasing gear integral with said bearing closure member positioned inwardly of said side housing within said epitrochoidal cavity; a distributor drive shaft rotatably supported in said side housing member adjacent said aperture in a position substantially normal to the longitudinal axis of said crankshaft; a driven gear attached to said distributor drive shaft; and a distributor drive gear in the form of a cylindrical sleeve attached to said eccentric and overlying said fixed phasing gear engaging said distributor driven gear, a circumferential slot in said cylindrical sleeve drive gear providing for engagement between said rotor phasing gear and said fixed phasing gear providing planetating movement of said rotor relative to said crankshaft.

* * * * *